(12) United States Patent
Leon

(10) Patent No.: US 9,510,565 B2
(45) Date of Patent: Dec. 6, 2016

(54) DOG COUPLER AND METHOD OF MANUFACTURE

(71) Applicant: Michael A Leon, Orlando, FL (US)

(72) Inventor: Michael A Leon, Orlando, FL (US)

( * ) Notice: Subject to any disclaimer, the term of this patent is extended or adjusted under 35 U.S.C. 154(b) by 0 days.

(21) Appl. No.: 14/756,682

(22) Filed: Sep. 28, 2015

(65) Prior Publication Data

US 2016/0095299 A1 Apr. 7, 2016

Related U.S. Application Data

(60) Provisional application No. 62/071,805, filed on Oct. 3, 2014.

(51) Int. Cl.
*A01K 27/00* (2006.01)

(52) U.S. Cl.
CPC .................... *A01K 27/005* (2013.01)

(58) Field of Classification Search
CPC .... A01K 27/003; A01K 27/005; A01K 27/00; A01K 27/001
USPC .......................... 119/792, 795, 798, 856, 863
See application file for complete search history.

(56) References Cited

U.S. PATENT DOCUMENTS

| | | | | |
|---|---|---|---|---|
| 3,817,218 A | * | 6/1974 | Bongiovanni | A01K 27/001 119/856 |
| 4,031,859 A | * | 6/1977 | Stewart | A01K 27/007 119/654 |
| 4,488,511 A | * | 12/1984 | Grassano | A01K 27/005 119/798 |
| 4,892,063 A | * | 1/1990 | Garrigan | A01K 27/003 119/795 |
| 5,046,456 A | * | 9/1991 | Heyman | A01K 27/006 119/859 |
| 5,080,045 A | * | 1/1992 | Reese | A01K 27/005 119/770 |
| 5,140,946 A | * | 8/1992 | Pennock | A01K 27/006 119/859 |
| 5,184,573 A | * | 2/1993 | Stevens, Jr. | A01K 27/007 119/654 |
| 5,794,572 A | * | 8/1998 | Saunders | A01K 27/006 119/858 |
| 5,813,368 A | * | 9/1998 | Rasmussen | A01K 27/003 119/799 |

(Continued)

*Primary Examiner* — Yvonne Abbott-Lewis
(74) *Attorney, Agent, or Firm* — Harry I. Leon; Vivian L. Steadman

(57) ABSTRACT

On leash, dogs enjoy being tethered together, provided they can detect directional changes in their partner's movements. The dog coupler includes a semi-rigid hollow tube, each distal end of which is pressure fitted with a clip fastenable to a dog's collar or harness. Fabricated of resilient plastic tubing, about 18 inches long, the tube, when relaxed, forms a shallow arch. Arched more deeply by compression or, alternately, straightened out, the tube acts like a weak spring but exhibits substantially stronger spring tension when stretched. Because of the tube's three distinct spring constants, two dogs, individually tethered at the tube's distal ends, can communicate, via tube, their relative positions as they move toward or apart from each other. Working to prevent negative feedback, each dog is trained to space itself properly instead of bumping into or pulling away from its partner, thus enabling the two dogs to walk or run well tethered together.

4 Claims, 1 Drawing Sheet

(56) References Cited

U.S. PATENT DOCUMENTS

| | | | | |
|---|---|---|---|---|
| 6,247,428 B1* | 6/2001 | Mireles | ............... | A01K 27/003 |
| | | | | 119/771 |
| 6,460,488 B1* | 10/2002 | Manzella | ............. | A01K 27/003 |
| | | | | 119/712 |
| 7,011,427 B1* | 3/2006 | Baez | ...................... | G08B 5/004 |
| | | | | 362/184 |
| 7,703,418 B2* | 4/2010 | Henderson | ........... | A01K 27/002 |
| | | | | 119/792 |
| 7,726,261 B2* | 6/2010 | Everhart | ............. | A01K 27/005 |
| | | | | 119/771 |
| 7,805,816 B1* | 10/2010 | Thorne, III | ........... | B60P 7/0807 |
| | | | | 24/265 H |
| 7,997,235 B2* | 8/2011 | Hurwitz | ................. | D07B 1/148 |
| | | | | 119/793 |
| 8,006,650 B2* | 8/2011 | Tollman | ................... | A01K 1/04 |
| | | | | 119/771 |
| 8,151,737 B1* | 4/2012 | Alonzo | ............... | A01K 27/003 |
| | | | | 119/798 |
| 9,032,911 B2* | 5/2015 | Hill | ...................... | A01K 27/003 |
| | | | | 119/795 |
| 2013/0133592 A1* | 5/2013 | Church | ............... | A01K 27/003 |
| | | | | 119/795 |

* cited by examiner

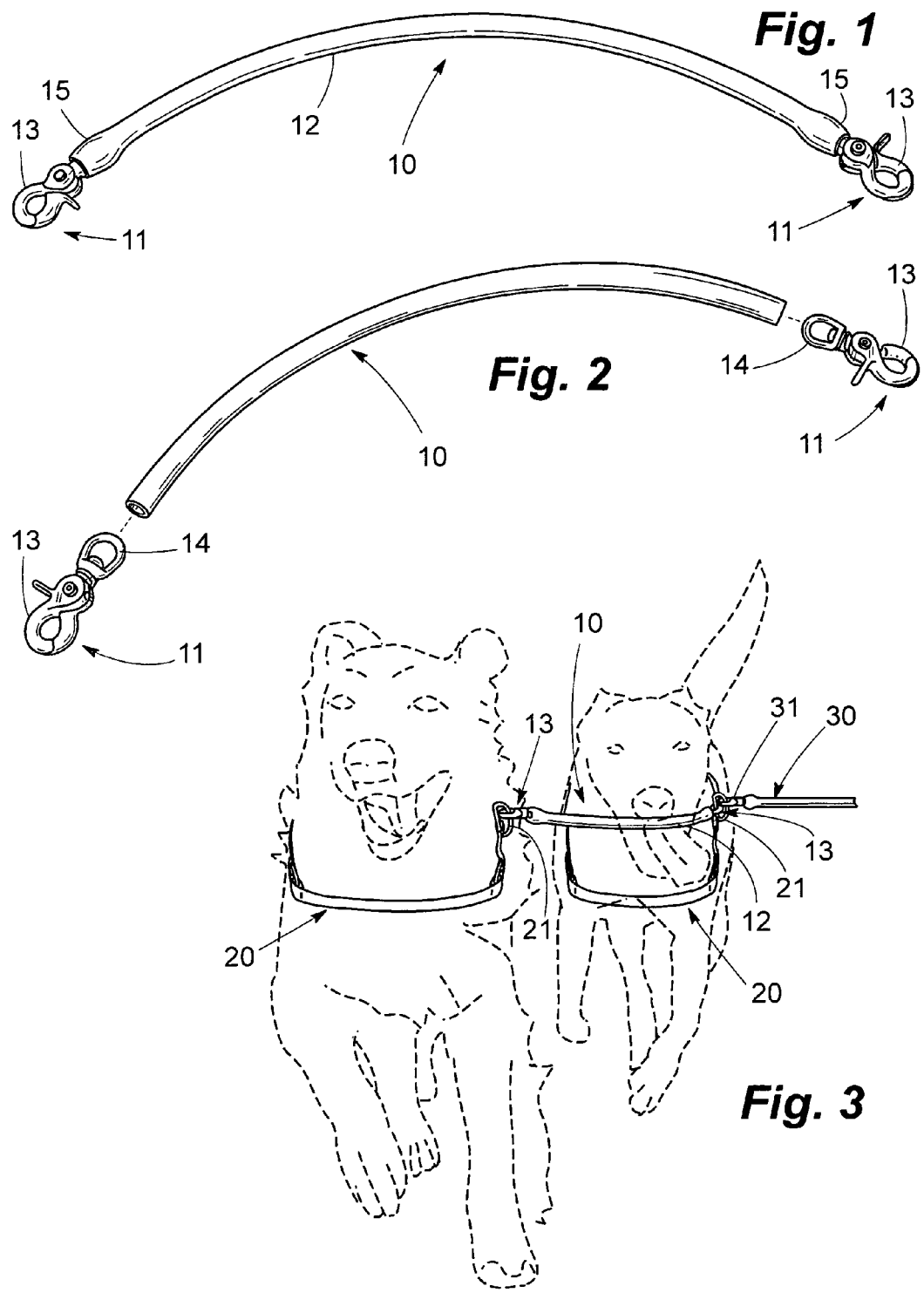

DOG COUPLER AND METHOD OF MANUFACTURE

CROSS REFERENCE TO RELATED APPLICATION

This application claims the benefit of U.S. Provisional Patent Application Ser. No. 62/071,805, filed on Oct. 3, 2014, the contents of which are herein incorporated by reference in their entirety.

BACKGROUND OF THE INVENTION

A large percentage of dog owners have more than one dog. Additionally, professional dog walkers, trainers and handlers often walk multiple dogs simultaneously in order to optimize their use of time. Unfortunately, having an individual, full length regular walking leash for each dog greatly increases the likelihood that the leashes will become entangled, potentially causing the person walking the animals to lose control of them. A need exists for a device which can be used to safely tether multiple dogs together on a single leash.

Dog leashes which allow the owner to keep multiple dogs on leash and walk them using a single hand-held device are well known in the prior art. Prominent among the shortcomings of such devices is the absence of a feedback mechanism between the dogs. Lacking such feedback, the animals run the risk of not only tangling their various leashes but also tripping against, and even over, one another.

Also known in the prior art is a device for tethering just two dogs together in which a pair of leashes are coupled in such a way that they form a bundle that helps to maintain spacing between the tethered dogs. Nevertheless, with the latter device, whether it is of a fixed length or of a very stretchable type, one finds that the dogs' nature often drives them to pull to the full extent of their respective leashes. Indeed, such a coupling actually exacerbates the two dogs' natural tendencies to pull against each other.

Pulling hard away from each other, the dogs can quickly spread themselves too far apart for the person walking them to maintain control, especially when the distance separating the animals is greater than the width of the walkway. More-over, the applicant's experience has been that excessive side-ways pulling away from one another on the part of a pair of tethered dogs leads to increased paw pad wear and tearing. This result is, of course, counterproductive from the perspective of those who might otherwise employ the bundle or a like two leash coupling device in order to carry out a more intense-than-walking exercise regiment one, for example, in which the two dogs, when tethered alongside of a bicyclist, are encouraged to run fast, frequently, and/or over long distances.

Not surprisingly, related problems stemming from this natural tendency of dogs to pull on a leash to its full extent show up even in the case of a single tethered animal— including one that is trying its best to follow a bicyclist's lead but is tethered to the bicycle by a flexible strap. As taught by Leon in U.S. Pat. No. 8,544,420, it is only by pulling on the strap in an attempt to eliminate any slackness in it that the dog, in such a situation, can gain, through direct physical contact, an accurate sense of the direction in which the bicyclist wishes to head.

Realizing that one way to get dogs to walk or run well when tethered together is to reward them for correct positioning, the applicant then analyzed his own dogs' behavior after first testing them to determine just how they would respond, depending upon their positions and spacing relative to each other, when two of them were run at the same time along the side(s) of a bicycle to which they were individually tethered by a dog leash. (The dog leashes employed in this testing are among those taught by Leon in U.S. Pat. Nos. 7,013,840 and 8,544,420.) The applicant's findings were that the dogs enjoyed being close together—specifically, running side by side rather than along separate sides of the bicycle—provided they were kept just far enough apart to keep them from tripping on each other. More-over, he found that by so running the dogs side by side and in close enough proximity that each partner dog was well aware of what the other dog was doing, the dogs could travel much faster and farther alongside of the bicyclist than when such awareness was lacking.

SUMMARY OF THE INVENTION

The object of the present invention is to provide a dog coupler which, when its distal ends are directly attached to the leash holder of a first dog's harness or collar and to a second dog's harness or collar, respectively, can be used to deploy two dogs side by side of each other and alongside of a bike rider but spaced apart from the bike frame by a slack-free, but bendably flexible leash connected thereto which, when the dogs walk or run in a heel position with respect to the bicyclist, extends perpendicularly to the frame, with the coupler being movably linked in series with said leash in such a way that each dog individually occupies, as it walks or runs alongside the bicyclist, a separate but narrow zone of travel that extends generally parallel with the direction of the bike's forward motion unless the dogs are barred from so occupying their respective travel zones by an obstacle which forces one dog to trail behind the other, and with the coupler so movably linked and directly attached being constructed in such a way that each dog can immediately detect changes in the direction of the movements of the other dog with which it is so deployed.

A further object of the invention is to provide such a dog coupler which an individual holding onto a regular leash which has been so movably linked in series with the coupler can use to gently train two or more dogs to safely walk or run at the same time in the heel position beside said individual.

A still further object of the invention is to provide such a dog coupler which, once a connector for the slack-free, but bendably flexible leash has been mounted, distally from said leash's movable linkage in series with the coupler, onto the frame of a bicycle, tricycle, or other mobility-enhancing personal carrier, a person can use in order to tether two dogs to the carrier without the dogs interfering with its operation so that he can safely ride on it and at the same time give the dogs a chance to exercise as they run or walk within the rider's peripheral view and close by his side.

Yet another object of the invention is to provide such a dog coupler which, once the connector for the slack-free, but bendably flexible leash has been so mounted onto the frame of a bicycle, a bicyclist can use to help the tethered dogs exert themselves to their full potential so that the bicyclist and the dogs, as they exercise by pedaling and running, respectively, can travel farther and faster than would otherwise be possible.

In accordance with the present invention, there is provided a coupler, simultaneously fastenable onto a first leash holder, such as a "D" ring, attached to a first dog's collar or harness and to a second leash holder attached to a second dog's collar or harness. The coupler comprises a pair of clip assemblies and an elongated tube, each distal end of which is permanently fitted with one of the clip assemblies by pressure fitting the latter into it. Fabricated of a plastic tubing, the tube forms, during the pressure fitting process, a barb at each of its distal ends as a clip assembly's attachment ring, which is of larger diameter than the tube's inner diameter, is being inserted into it. Accomplished by lubricating the ring with a volatile lubricant prior to the ring's being pressed into the tube's end, this process results in a pair of spaced apart barbs, each of which, once the lubricant evaporates, strongly holds an attachment ring in place within the tube. So held, the attachment ring is immobilized, thus fixing its position with respect to the tube's longitudinal centerline.

The stiffness of the plastic tubing from which the tube is fabricated must be such that, when the coupler's overall length measures, by way of example, about 19 inches, the tube remains tangle free when the coupler, otherwise unrestrained, is held by one end in such a way that the tube itself extends generally horizontally. With this degree of stiffness, a positive signal is transmitted, through the coupler, between said first and second dogs whenever one of them moves relative to the other. Moreover, such couplers with the overall length of about 19 inches have been found to be ideal for use with most animals when deployed to join the collars/harnesses of two dogs since it allows plenty of room for them to run and at the same time keeps them close enough to each other for occasional contact as their bodies brush against each other, thus encouraging them to run in step and fostering a sense of companionship.

Slightly curved in its relaxed state, the tube forms a shallow arch that extends between the tube's distal ends, with the arch's span and the tube by itself, unstretched but straightened out lengthwise, measuring, by way of example, about 17 and 18 inches, respectively. Because of the arch's slight curvature, as well as the plastic tubing's resilient properties, the tube exhibits varying degrees of stiff, but springy action in response to the first and second dogs' exertions as they move toward each other or, alternately, try to space themselves further apart, thus giving the tethered animals negative feedback critical to their being trained and otherwise enabled to space themselves properly instead of bumping into each other or pulling away. In addition, this slight curvature of the tube facilitates the process of connecting the coupler to two animals of different sizes.

Besides the attachment ring, each clip assembly also includes a clip and a bearing which connects the clip to the ring in such a way that the clip is free to rotate about the tube's longitudinal centerline; but, because the ring is immobilized, the clip cannot move from side to side independently of the tube. Thus during use, not only is the coupler prevented from becoming entangled with one or both of the dog collars/harnesses to which the clips on the coupler's distal ends are attached, but also dog-distracting chatter from clip-generated rattles and the like is eliminated.

BRIEF DESCRIPTION OF THE DRAWINGS

FIG. 1 is a side perspective view of the dog coupler according to the present invention;

FIG. 2 is an exploded view of the dog coupler according to FIG. 1; and

FIG. 3 is a perspective view, on a reduced scale, of the dog coupler according to FIG. 1, the dog coupler being shown with its distal ends attached to a "D" ring on a first dog's collar and to a second dog's collar, respectively, with the former "D" ring movably linking the dog coupler in series to a slack-free, but bendably flexible dog leash as taught by Leon in U.S. Pat. No. 8,544,420 and with only a fragmentary portion of the leash which includes its clip being shown.

DETAILED DESCRIPTION OF THE PREFERRED EMBODIMENT

In the drawings and indicated generally by the reference numeral 10 is a dog coupler according to the present invention. As illustrated in FIG. 1, the dog coupler 10 comprises an elongated tube 12, which, in its relaxed state, is slightly curved, and a pair of clip assemblies 11. Available commercially as a single unit, each clip assembly 11 includes a attachment ring 14 on which a spring-loaded clip 13 is pivotally mounted (FIG. 2). Preferably, the tube 12 is fabricated from urethane plastic tubing with a standardized hardness rating of 90 D and measures ½ inch in outside diameter, about ⅜ inch in inside diameter, and, when straightened out lengthwise, about 18 inches in length.

In assembled relation, each of the attachment rings 14 is individually held within a barb 15 formed proximate with a distal end of the tube 12 (FIGS. 1 and 2). Formed in the course of pressure fitting the ring 14, which has an outer diameter greater than that of the tube's inner diameter, into one of the tube's distal ends, the barb 15 holds the ring strongly. Indeed, a force of about 400 lbs. is required to separate the ring 14 from the barb 15 once a volatile lubricant applied to the ring just prior to the pressure fitting process has evaporated. Hence, the coupler 10, with its interfaces between the rings 14 and the barbs 15 so constituted, will not release a pair of dogs tethered to it under any loads they may exert on it by pulling. Nevertheless, in order to prevent the dogs from being harmed should they come into contact with a post or a like fixed object, the spring-loaded clip 13, when subjected to a force of about 150 lbs., will fail.

As illustrated in FIG. 3, two dogs of different sizes, tethered by a single, slack-free, but bendably flexible dog leash 30, are shown running in step side by side. Joining the dogs so tethered is a dog coupler 10 which connects the "D" rings on their respective collars, with the "D" ring 21 on the collar 20 of one of the dogs performing dual functions in that it also serves as a leash holder onto which the dog leash's clip 31 is fastened, thus movably linking the coupler in series with the leash 30. Distal from the clip 31, the dog leash's terminal end (not shown) may be hand-held or, alternately, connected to the frame of a bicycle, tricycle, or other personal carrier, as taught by Leon in U.S. Pat. No. 8,544,420. With the coupler 10 and the leash 30 so movably linked and with the dog leash's terminal end so connected, the first dog directly receives, through the leash, nonverbal signals which communicate the speed and direction of the bicycle or other personal carrier. As long as the first dog positions itself properly in response to such signals, they are in turn communicated through the coupler 10 to the second dog, thereby enabling it to adjust its position and follow the bicyclist's/rider's lead as well.

Whenever the tethered dogs move toward each other and, in so doing, compress the tube 12, causing its midsection to be displaced and the spacing between the tube's distal ends to be reduced, the coupler's response is to act like a spring. As a result, a positive signal is transmitted between the dogs which communicates to them their relative positions, as well as the need for each dog to properly position itself. Likewise, when the dogs initially start to move apart, the tube's shallow arch straightens, giving rise to a light spring-like tension which is communicated as a negative feedback to both animals. Should the dogs nevertheless continue to separate from each other, the tube 12 then begins to stretch; and a substantially stronger spring tension is triggered, unmistakeably signaling the animals that their misbehavior will not be rewarded, thus encouraging them to space themselves so that they have room to walk or run yet keep themselves in close enough proximity to each other that they can enjoy not only each other's companionship but also the absence of such feedback.

The invention claimed is:

1. In a coupler for simultaneously tethering, with a single leash, first and second dogs, each of which is wearing a dog collar or harness to which an individual leash holder is attached, means for regulating spacing between the two dogs' relative positions when the dogs walk or, alternately, run side by side headed in the same direction, the regulating means including:

a pair of fastening devices; and an elongated tube fabricated from semi-rigid, resilient plastic tubing, the elongated tube, in assembled relation with the fastening devices, defining a pair of barbs, each of which is disposed, concentrically with the tube's longitudinal centerline, at one of the tube's distal ends, the elongated tube defining a hollow midsection pre-formed in the shape of a shallow arch which extends the full length of the tube between the pair of barbs;

wherein the elongated tube is free of any protruding members separating said length;

wherein each of the tube's distal ends is permanently fitted with one of the fastening devices and each such device includes a pivotally mounted clip which protrudes longitudinally from the distal end to which the device is so fitted, with the orientation of the clip's rotational axis being fixed with respect to the tube's longitudinal centerline at said distal end;

wherein both of the clips are removably fastenable to the leash holders;

wherein the span of the elongated tube and the two fastening devices, in assembled relation, is long enough that when, as the two dogs stand side by side headed in the same direction, the leash holder attached to the collar or harness worn by the first dog is held on a side of its body which faces away from the second dog's body, and the leash holder attached to the collar or harness worn by the second dog is held on the side of its body which faces toward the first dog's body, one of the clips can be directly fastened to the first dog's leash holder at the same time the other clip is so fastened to the second dog's leash holder by positioning the tube's midsection so that it extends, generally perpendicularly to the direction in which the dogs are headed, across a narrow space separating the side-by-side dogs and under the first dog's muzzle;

wherein said regulating means stabilizes the spacing between the two dogs' relative positions at its optimum breadth, provided the tube's midsection, at such a moment, assumes a relaxed state in which the tube is generally free of any type of spring force, the relaxed state being one in which the midsection's radius of curvature approximates that of the shallow arch in the shape of which the midsection was pre-formed, with the midsection's radius of curvature otherwise varying, with the direction and extent, of sideways movement by one or both dogs, as such sideways movement causes said spacing to deviate from the optimum breadth and, in so doing, gives rise to an instantaneous stiff, springy reaction from the elongated tube, which then exerts a spring force, through the tube's distal ends, on said sides of the dogs' bodies; and wherein said optimum breadth occurs whenever the narrow space is just wide enough to keep the two dogs from tripping on each other as they walk or run side by side together, thereby stringing the dogs' collars or harnesses in series from the single leash when it, too, is fastened to the first dog's leash holder.

2. The coupler according to claim 1, wherein the spring force which the elongated tube exerts, through its distal ends, in response to sideways movement in which the sideways-moving dog pushes the tube's distal ends closer together than they were in the midsection's relaxed state is further characterized as being a compression spring force which causes the first dog's leash holder to be pulled away from the first dog's body and, at the same time, the clip fastened to the second dog's leash holder to be pushed against the second dog's body, the compression spring force's delivery being such that both dogs are supplied with instant feedback to said sideways movement, thus enabling them to adjust their relative positions and avoid bumping into each other even as they run at full speed.

3. The coupler according to claim 1, wherein each fastening device further includes an attachment ring on which the clip is so pivotally mounted, the ring, which defines a through opening and which has an outer diameter which is greater than the tube's inner diameter, being individually held within one of the tube's distal ends, said barb at each of the tube's distal ends having been formed upon insertion of the ring, coated with a volatile lubricant, into the tube's distal end during a pressure fitting process and subsequent shrinking of portions of said distal end about the ring so as to create a constriction in the tube's wall, said constriction, which is disposed between the clip and the ring's through opening, enclosing the through opening in its entirety, each barb, upon evaporation of the lubricant, strongly holding one of the rings in place, thereby preventing the tethered dogs from pulling apart the tube and either of its rings.

4. A method of manfacture for a dog coupler which includes the following steps:

(a) lubricating the attachment ring of a clip assembly with a volatile lubricant, the clip assembly including a clip pivotally mounted on the ring which itself defines a through opening; and (b) inserting and then pressure fitting the ring into one end of a hollow tube fabricated of a semi-rigid, resilient plastic tubing which has an inner diameter which is smaller than that of the ring, the ring, upon its being inserted into the tube's end, being positioned far enough therewithin that during subsequent shrinking of portions of said end about the ring, both a protuberance and a constriction are formed in the tube's wall, both of which are disposed generally concentrically with respect to the tube's longitudinal centerline, the constriction, which is located between the clip and the ring's through opening, enclosing the through opening in its entirety while, at the same time, the clip is kept free to rotate about its connection with the ring and the clip's rotational axis is fixedly oriented with respect to the tube's longitudinal centerline.

* * * * *